United States Patent
Yamashita

(10) Patent No.: US 7,486,055 B2
(45) Date of Patent: Feb. 3, 2009

(54) DC-DC CONVERTER HAVING A DIODE MODULE WITH A FIRST SERIES CIRCUIT AND A SECOND SERIES WITH A FLYWHEEL DIODE

(75) Inventor: Masaya Yamashita, Kitasaku-gun (JP)

(73) Assignee: Mineba Co., Ltd., Kitasaku (JP)

( * ) Notice: Subject to any disclaimer, the term of this patent is extended or adjusted under 35 U.S.C. 154(b) by 328 days.

(21) Appl. No.: 10/592,672

(22) PCT Filed: Feb. 3, 2005

(86) PCT No.: PCT/JP2005/001606

§ 371 (c)(1),
(2), (4) Date: Sep. 13, 2006

(87) PCT Pub. No.: WO2005/107052

PCT Pub. Date: Nov. 10, 2005

(65) Prior Publication Data

US 2007/0194769 A1    Aug. 23, 2007

(30) Foreign Application Priority Data

Apr. 30, 2004    (JP) .............................. 2004-135916

(51) Int. Cl.
*G05F 1/656* (2006.01)
*G05F 1/652* (2006.01)
*G05F 3/00* (2006.01)

(52) U.S. Cl. .................. 323/222; 323/225; 323/233; 323/232; 323/266

(58) Field of Classification Search .............. 323/222, 323/225, 233, 232, 266
See application file for complete search history.

(56) References Cited

U.S. PATENT DOCUMENTS

| 4,847,742 | A |   | 7/1989  | Ohashi et al. |
|-----------|---|---|---------|---------------|
| 5,446,366 | A |   | 8/1995  | Bassett et al. |
| 5,448,465 | A |   | 9/1995  | Yoshida et al. |
| 5,736,842 | A |   | 4/1998  | Jovanovic |
| 6,069,809 | A | * | 5/2000  | Inoshita ........................ 363/98 |
| 6,091,615 | A | * | 7/2000  | Inoshita et al. ................. 363/98 |
| 6,147,881 | A | * | 11/2000 | Lau .............................. 363/17 |
| 6,690,143 | B2 | * | 2/2004 | Lin et al. ..................... 323/222 |
| 7,023,186 | B2 | * | 4/2006 | Yan ............................. 323/225 |
| 7,161,331 | B2 | * | 1/2007 | Wai et al. ..................... 323/222 |
| 7,215,101 | B2 | * | 5/2007 | Chang ......................... 323/224 |
| 7,218,081 | B2 | * | 5/2007 | Jang et al. .................... 323/266 |
| 7,233,507 | B2 | * | 6/2007 | Schenk ........................ 363/50 |

(Continued)

FOREIGN PATENT DOCUMENTS

CN    1482727 A    3/2004

(Continued)

*Primary Examiner*—Bao Q Vu
(74) *Attorney, Agent, or Firm*—Oliff & Berridge, PLC

(57) ABSTRACT

There is provided a DC-DC converter including: a main switching element to perform an on-off operation; a first choke coil; an output capacitor; and a diode module. The diode module includes a first series circuit which includes an auxiliary switching element and a resonant capacitor, and a second series circuit which includes a flywheel diode and a resonant coil, wherein the first series circuit and the second series circuit are connected in parallel to each other. The DC-DC converter reduces the switching loss, deals with an extensive range of input and output voltage variation, and accommodates easy modifications from conventional circuits.

17 Claims, 10 Drawing Sheets

U.S. PATENT DOCUMENTS

| | | | |
|---|---|---|---|
| 7,385,833 B2 * | 6/2008 | Keung | 363/56.12 |
| 2001/0011885 A1 | 8/2001 | Nakagawa | |
| 2003/0222629 A1 | 12/2003 | Inoue et al. | |

FOREIGN PATENT DOCUMENTS

| | | |
|---|---|---|
| DE | 43 28 458 A1 | 4/1994 |
| EP | 0 129 411 A2 | 12/1984 |
| EP | 1 126 585 A2 | 8/2001 |
| JP | A-60-002026 | 1/1985 |
| JP | A-63-249470 | 10/1988 |
| JP | A-06-078537 | 3/1994 |
| JP | A-07-046831 | 2/1995 |
| JP | A-2002-262551 | 9/2002 |
| JP | A-2003-189602 | 7/2003 |
| JP | A-2004-056992 | 2/2004 |

* cited by examiner

[t0-t1]

[t1-t2]

[t2-t3]

[t3-t4]

[t4-t5]

[t5-t6]

[t6-t7]

[t7-t8]

[t8-t9]

[t9-t10]

[t10—t1]

DC-DC CONVERTER HAVING A DIODE MODULE WITH A FIRST SERIES CIRCUIT AND A SECOND SERIES WITH A FLYWHEEL DIODE

FIELD OF THE INVENTION

The present invention relates to a DC-DC converter, and particularly to a DC-DC converter incorporating a diode module to enable reduction of switching loss.

BACKGROUND OF THE INVENTION

A DC-DC converter, which, through switching control of a semi-conductor device, converts an input DC voltage into a desired stable DC voltage, has such advantages as high efficiency and easy reduction in dimension and weight, and therefore is used as an essential constituent in power supplies for various electronic devices, in controlling electrical motors based on inverter technology, and in circuits to light various discharge lamps.

FIG. 16 is a circuit diagram of a typical step-down DC-DC converter 100. The DC-DC converter 100 includes a field-effect transistor Q1 as a main switching element, a flywheel diode D3, a choke coil L1, an output capacitor C5, and a control circuit 102, wherein a voltage Vi is a DC power source, R1 is a load, and C1 is a junction capacitance formed between the drain and source terminals of the field-effect transistor Q1.

The DC power source Vi has its positive terminal connected to the drain terminal of field-effect transistor Q1 and has its negative terminal grounded. The field-effect transistor Q1 is connected via its source terminal to the cathode terminal of the flywheel diode D3 and also to one terminal of the choke coil L1 which has its other terminal connected to one terminal of the output capacitor C5. The other terminal of the output capacitor C5 and the anode terminal of the flywheel diode D3 are grounded. The control circuit 102 is connected via its sensing terminal to the other terminal (positioned toward the load R1) of the choke coil L1, and via its output terminal to the gate terminal of the field-effect transistor Q1.

The DC-DC converter 100 operates as follow. Under a steady state condition with the field-effect transistor Q1 set turned-off, when the field-effect transistor Q1 is turned on, a current flows from the DC power source Vi to the choke coil L1 via the field-effect transistor Q1, and a voltage at the other terminal (positioned toward the load R1) of the choke coil L1 is smoothed by the output capacitor C5 and then applied to the load R1. While the field-effect transistor Q1 stays turned-on, energy is stored up in the choke coil L1 according to the current. Then, when the field-effect transistor Q1 is turned off, electromotive force is generated across the both terminals of the choke coil L1, and the current maintained by the electromotive force commutates to flow through the flywheel diode D3, whereby the energy stored up during the turn-on period of the field-effect transistor Q1 is supplied to the load R1.

With repletion of the operation described above, a voltage according to the duty ratio (on-time/on-time+off-time) of the field-effect transistor Q1 is outputted across the both terminals of the load R1. In order to keep the output voltage constant irrespective of variations of the input voltage (Vi) and the load R1, the control circuit 102 performs pulse width modulation (PWM) control, in which the duty ratio of the field-effect transistor Q1 is modulated according to a detected level of the output voltage.

In the DC-DC converter 100 described above, due to the junction capacitance C1 formed between the drain and source terminals of the field-effect transistor Q1 and also due to wiring-related parasitic inductances, a transitional period, at which a non-zero voltage across drain and source terminals and a non-zero drain current are concurrently present, arises at the moment when the field-effect transistor Q1 turns on or turns off, and a switching loss is thereby caused. Since the switching loss becomes larger with increase of a frequency for performing on-off control, a serious problem is involved when reduction of the dimension and weight of an apparatus is sought to be achieved by increasing the on-off control frequency so as to reduce the inductance of a choke coil and the capacitance of an output capacitor. Further, there is another problem that when the field-effect transistor Q1 turns off thereby reverse-biasing the flywheel diode D3, a large recovery current is caused to flow from the cathode to the anode at the reverse recovery time resulting in causing a heavy loss.

Under the circumstances described above, what is called a "soft switching technique" is conventionally applied which utilizes resonance thereby reducing losses attributable to the switching loss and the recovery current. For example, Japanese Patent Application Laid-Open No. 2003-189602 discloses a DC-DC converter in which a resonant circuit uses the junction capacitance of a switching element and a rectifying element in order to deal with an extensive range of an input and output voltage variation.

In the DC-DC converter disclosed in the aforementioned Japanese Patent Application, however, when the duty ratio is set small, a resonant coil cannot build up a sufficient energy thus resulting in a decreased voltage of a resonant capacitor. If this condition goes on, the voltage polarity of the resonant capacitor is reversed, and the resonant coil cannot be reset. Also, in the DC-DC converter, a rectification circuit, which is constituted by a rectifying diode (flywheel diode) and additional components for resonance, is structured such that only the resonant coil is located between a first switching element and a choke coil while the other components are connected in parallel to the resonant coil, and consequently if the rectification circuit is made into one module, then the circuit is to come with at least three terminals, which hampers an easy modification from a conventional circuit which incorporates only a flywheel diode that is a two-terminal element.

SUMMARY OF THE INVENTION

The present invention has been made in light of the problems described above, and it is an object of the present invention to provide a DC-DC inverter which reduces the switching loss, is adapted to duly deal with an extensive range of input and output voltage variation, and which incorporates a diode module to allow modifications to be readily made from various conventional circuits.

In order to achieve the object described above, according to an aspect of the present invention, there is provided a DC-DC converter including: a main switching element to perform an on-off operation thereby converting the voltage of a DC power source into a different DC voltage; a first choke coil; an output capacitor; and a diode module which includes a first series circuit including an auxiliary switching element and a resonant capacitor, a second series circuit including a flywheel diode and a resonant coil and connected in parallel to the first series circuit, and a second diode connected between the connection point of the auxiliary switching element and the resonant capacitor and the connection point of the flywheel diode and the resonant coil.

In the aspect of the present invention, the diode module may further include a first diode connected in parallel to the resonant capacitor.

In the aspect of the present invention, the DC-DC converter may be structured such that one terminal of the main switching element is connected to one terminal of the DC power source, the other terminal of the main switching element is connected to one terminal of the first choke coil, the other terminal of the first choke coil is connected to one terminal of the output capacitor, and that the diode module is connected between the other terminal of the DC power source and the connection point of the main switching element and the first choke coil, whereby a step-down operation is performed.

In the aspect of the present invention, the DC-DC converter may be structured such that one terminal of the first choke coil is connected to one terminal of the DC power source, the other terminal of the first choke coil is connected to one terminal of the main switching element, the other terminal of the main switching element is connected to the other terminal of the DC power source, and that the diode module is connected between one terminal of the output capacitor and the connection point of the first choke coil and the main switching element, whereby a step-up operation is performed.

In the aspect of the present invention, the DC-DC converter may be structured such that one terminal of the main switching element is connected to one terminal of the DC power source, the other terminal of the main switching element is connected to one terminal of the first choke coil, the other terminal of the first choke coil is connected to the other terminal of the DC power source, and that the diode module is connected between one terminal of the output capacitor and the connection point of the main switching element and the first choke coil, whereby a step-up and step-down operation is performed.

In the aspect of the present invention, the DC-DC converter may further include a coupling capacitor and a second choke coil, and may be structured such that one terminal of the first choke coils is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to one terminal of the output capacitor, and that the diode module is connected between the other terminal of the DC power source and the connection point between the coupling capacitor and the second choke coil, whereby a step-up and step-down operation is performed.

In the aspect of the present invention, the DC-DC converter may further include a coupling capacitor and a second choke coil, and may be structured such that one terminal of the first choke coil is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to the other terminal of the DC power source, and that the diode module is connected between one terminal of the output capacitor and the connection point of the coupling capacitor and the second choke coil, whereby a step-up and step-down operation is performed.

In the aspect of the present invention, the DC-DC converter may further include a coupling capacitor and a second choke coil, and may be structured such that one terminal of the main switching element is connected to one terminal of the DC power source, the other terminal of the main switching element is connected to one terminal of the first choke coil and also to one terminal of the coupling capacitor, the other terminal of the first choke coil is connected to the other terminal of the DC power source, the other terminal of the coupling capacitor is connected to one terminal of the second choke coil, the other terminal of the second choke coil is connected to one terminal of the output capacitor, and that the diode module is connected between the other terminal of the DC power source and the connection point of the coupling capacitor and the second choke coil, whereby a step-up and step-down operation is performed.

In the aspect of the present invention, a capacitor may be connected in parallel to the main switching element.

And, in the aspect of the present invention, a third diode may be connected between the DC power source and the connection point of the resonant coil and the flywheel diode.

Accordingly, since the DC-DC converter according to the present invention is provided with the diode module including the first series circuit which includes the auxiliary switching element and the resonant capacitor, and the second series circuit which includes the flywheel diode and the resonant coil, wherein the first and second series circuits are connected to each other in parallel, the switching loss of the main and auxiliary switching elements and the recovery current of the flywheel diode can be reduced, and PWM control can be duly performed at a wide range of input and output voltage. Also, the diode module in the present invention is a two-terminal element, and therefore can readily replace a flywheel diode in a conventional DC-DC converter. And, since the second diode is connected between the connection portion of the auxiliary switching element and the resonant capacitor and the connection point of the flywheel diode and the resonant coil, the linking generation is inhibited.

Further, since the first diode is connected in parallel to the resonant capacitor of the diode module, the voltage of the resonant capacitor is prevented from flowing in the reverse direction. Consequently, the DC-DC converter can operate normally even when the duty ratio of the main switching element is very low.

And, the DC-DC converter according to the present invention can be readily materialized by providing the invention diode module in place of a flywheel diode used in the conventional circuit of any type converters, such as step-down, step-up, step-up and step-down, Cuk, Sepic and Zeta converters.

BRIEF DESCRIPTION OF THE DRAWINGS

FIGS. 5A to 5D each show a state of current at the operation of the DC-DC converter according to the first embodiment of the present invention, wherein FIG. 5A is for a period t0-t1 of the timing chart of FIG. 4, FIG. 5B is for a period t1-t2, FIG. 5C is for a period t2-t3, and FIG. 5D is for a period t3-t4;

FIGS. 6A to 6D each show a state of current at the operation of the DC-DC converter according to the first embodiment of the present invention, wherein FIG. 6A is for a period t4-t5 of the timing chart of FIG. 4, FIG. 6B is for period t5-t6, FIG. 6C is for a period t6-t7, and FIG. 6D is for a period t7-t8;

FIGS. 7A and 7B each show a state of current at the operation of the DC-DC converter according to the first embodiment of the present invention, wherein FIG. 7A is for a period t8-t9 of the timing chart of FIG. 9, and FIG. 7B is for a period t9-t10;

DETAILED DESCRIPTION OF THE EXEMPLARY EMBODIMENTS

Exemplary embodiments of the present invention will hereinafter be described with reference to the accompanying drawings.

Figure 1:
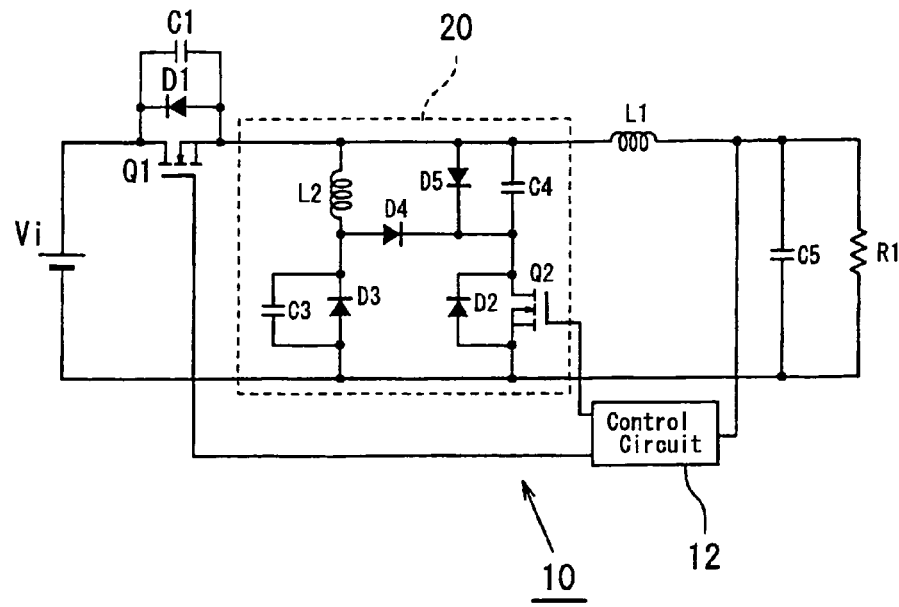
FIG. 1 is a circuit diagram of a DC-DC converter, specifically a step-down DC-DC converter, according to a first embodiment of the present invention.

Referring to FIG. 1, a DC-DC converter 10 according to a first embodiment of the present invention includes a main switching element Q1, a choke coil L1, an output capacitor C5, a diode module 20, and a control circuit 12. A voltage Vi is a DC power source, and a resistor R1 is a load. The main switching element Q1 is preferably constituted by a field-effect transistor, and a diode D1 and a capacitor C1, which are connected in parallel to the main switching element Q1, are respectively a body diode and a drain-to-source junction capacitance, which are contained in the field-effect transistor (Q1).

The DC-DC converter 10 is specifically a step-down DC-DC converter, in which the main switching element Q1 is connected via its drain terminal to the negative terminal of the DC power source Vi, and via its source terminal to one terminal of the choke coil L1 which has its other terminal connected to one terminal of an output capacitor C5, and the negative terminal of the DC power source Vi and the other terminal of the output capacitor C5 are grounded. The diode module 20 is connected between the negative terminal of the DC power source Vi and the connection point of the main switching element Q1 and the choke coil L1. The control circuit 12 is connected via its detection terminal to the other terminal (positioned toward the load R1) of the choke coil L1, and via its output terminal to the gate terminal of the main switching element Q1 and also to the gate terminal of an auxiliary switching element Q2 (to be described later) of the diode module 20.

Figure 2A:
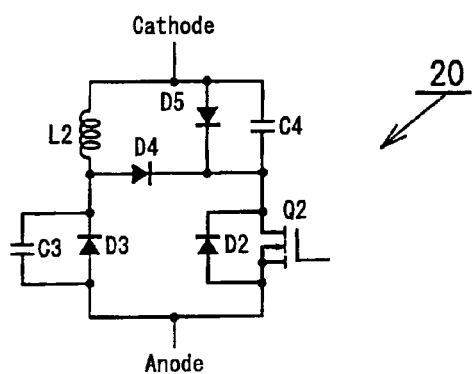
FIG. 2A is a circuit diagram of a diode module shown in FIG. 1.

Description will hereinafter be made on the structure of diode modules according to the present invention. Referring first to FIG. 2A, the diode module 20 shown in FIG. 1 is one exemplar and basically structured such that a first series circuit which is composed of the aforementioned auxiliary switching element Q2 and a resonant capacitor C4 is connected in parallel to a second series circuit which is composed of a flywheel diode D3 and a resonant coil L2. A first diode D5 is connected in parallel to the resonant capacitor C4, and a second diode D4 is connected via its cathode terminal to the connection point of the auxiliary switching element Q2 and the resonant coil L2, and is connected via its anode terminal to the connection point of the flywheel diode D3 and the resonant coil L2. The auxiliary switching element Q2 is preferably constituted by a field-effect transistor, and a diode D2 connected in parallel to the auxiliary switching element Q2 is a body diode contained in the field-effect transistor. A capacitor C3 connected in parallel to the flywheel diode D3 is a junction capacitance of the flywheel diode D3. The cathode and anode polarity of the diode module 20 can be defined as indicated in FIG. 2A according to the polarity of the flywheel diode D3.

Figure 2B:
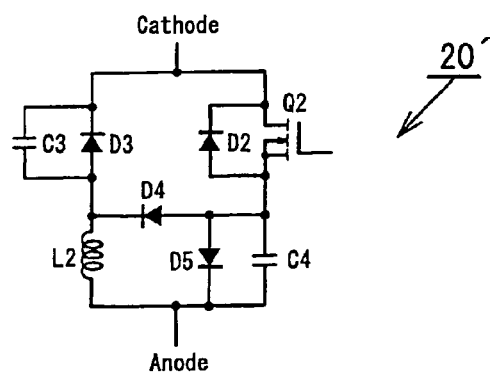
FIG. 2B is a circuit diagram of another diode module different from the diode module of FIG. 2A.

Referring now to FIG. 2B, a diode module 20', which is another exemplar, is basically structured such that a first series circuit which is composed of an auxiliary switching element Q2 and a resonant capacitor C4 is connected in parallel to a second series circuit which is composed of a flywheel diode 3D and a resonant coil L2. A first diode D5 is connected in parallel to the resonant capacitor C4, and a second diode D4 is connected via its anode terminal to the connection point of the auxiliary switching element Q2 and the resonant coil L2, and via its cathode terminal to the connection point of the flywheel diode D3 and the resonant coil L2. That is to say, the diodes D3, D4 and D5 and the auxiliary switching element Q2 of the diode module 20' shown in FIG. 2B are connected with their polarities inverted as compared with those of the diode module 20 shown in FIG. 2A. The cathode and node polarity of the diode module 20' can be defined as indicated in FIG. 2B according to the polarity of the flywheel diode D3.

In the diode modules 20, 20' shown in FIGS. 2A and 2B, respectively, in the case the second diode D4 is not used for the reason that the flywheel diode D3 has a sufficiently high withstand voltage, and also the generation of noises attributable to linking to be described later does not have to be taken into consideration, the auxiliary switching element Q2 and the resonant capacitor C4, which constitute the first series circuit, may be connected to each other in the reverse sequence, and the flywheel D3 and the resonant coil L2, which constitute the second series circuit, may be connected to each other in the reverse sequence.

The switching elements Q1 and Q2 are each constituted by a field-effect transistor in the above description, but other type switching elements, such as a bipolar transistor, and an insulated gate bipolar transistor (IGBT), may be used. And, depending on the characteristics of switching elements used, the diode D1 and the capacitor C1 both connected in parallel to the main switching element Q1, the diode D2 connected in parallel to the auxiliary switching element Q2, and the capacitor C3 connected to the flywheel diode D3 may be constituted by respective external components equivalent thereto.

Figure 16:
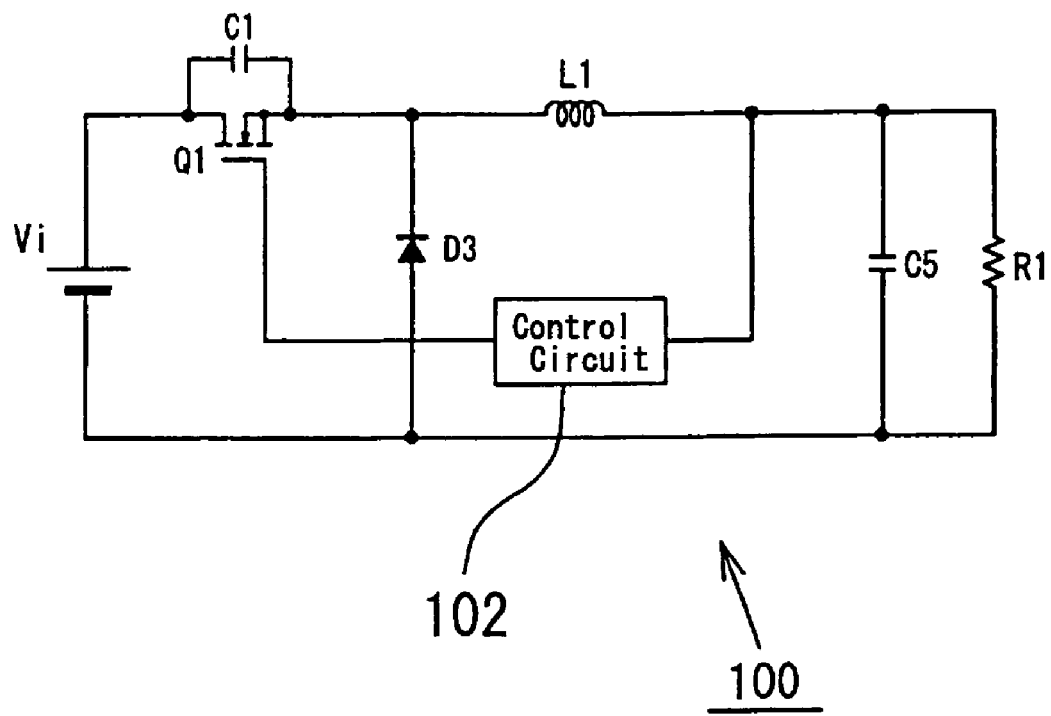
FIG. 16 is a circuit diagram of a conventional step-down DC-DC converter.

The operation of the DC-DC converter 10 will be described. Since the diode modules 20 and 20' have a similar operation, the description will be based on the diode module 20. Referring back to FIG. 1, the diode module 20 is connected via its cathode terminal to the connection point of the main switching element Q1 and the choke coil L1, and via its anode terminal to the negative terminal of the DC power source Vi, thus substituting for the flywheel D3 in the conventional step-down DC-DC converter 100 shown in FIG. 16, whereby the DC-DC converter 10 of the present invention is realized. In the operation of the DC-DC converter 10, the main switching element Q1 and the auxiliary switching element Q2 are driven by the control circuit 12 under the PWM control so as to turn on alternately with off-time interposed in-between.

Figure 3:
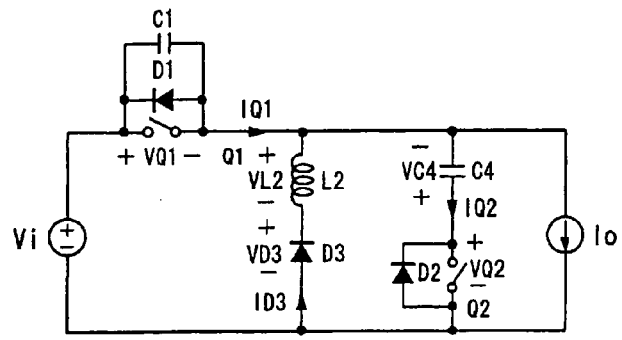
FIG. 3 is a schematic simplified for explaining the circuit diagram of FIG. 1.

In the DC-DC converter 10, it is assumed that the choke coil L1 has a sufficiently large inductance and functions practically as a constant current source Io (refer to FIG. 3), and the resonant capacitor C4 has a capacitance substantially larger than the junction capacitance of the auxiliary switching element Q2 and functions practically as a constant voltage source to supply a substantially constant voltage VC4 (refer to FIG. 3). Further, it is assumed that the main switching element Q1 and the auxiliary switching element Q2 have an on-resistance of almost zero, and all the diodes have a forward voltage of almost zero. Also, for easy understanding of the basic operation of the DC-DC converter 10, the effect by the junction capacitance C3 of the flywheel diode D3, and the operation of the first diode D5 and the second diode D4 are to be described later, and in the meantime it shall be deemed that the flywheel diode D3 is an ideal element having no junction capacitance, and the diode module 20 does not include the first diode D5 and the second diode D4. On the assumption set forth above, the circuit diagram as shown in FIG. 1 can be put into a simplified schematic as shown in FIG. 3.

Referring to FIG. 3, Vi is a constant current voltage supplied from the DC power source, and Io is a current flowing from the constant current source (hereinafter, the DC power source and the constant current source will also be denoted with Vi and Io, respectively, as appropriate). VQ1 is a voltage applied across the both terminals of the main switching element Q1, VQ2 is a voltage applied across the both terminals of the auxiliary switching element Q2, VD3 is a voltage applied across the both terminals of the flywheel diode D3, VL2 is a voltage applied across the both terminals of the resonant coil L2, and each direction from − to + as shown in FIG. 3 is defined as a positive direction. And, IQ1 is a current flowing through the main switching element Q1, IQ2 is a current flowing through the auxiliary switching element Q2, ID3 is a current flowing through the flywheel diode D3, and each direction pointed toward by an arrow in FIG. 3 is defined as a positive direction. In this connection, the current IQ1 includes a current flowing through the junction capacitance C1 of the main switching element Q1 and a current flowing through the body diode D1, and the current IQ2 includes a current flowing through the body diode D2 of the auxiliary switching element Q2.

The operation of the DC-DC converter 10, which starts from a stage where the main switching element Q1 is set turned-on in a steady state condition, then turned off, and which ends at a stage where the main switching element Q1 is turned on again to reach the steady state condition, will be described in detail with reference to FIG. 4, FIGS. 5A to 5D, FIGS. 6A to 6D, and FIGS. 7A and 7B.

Figure 4:
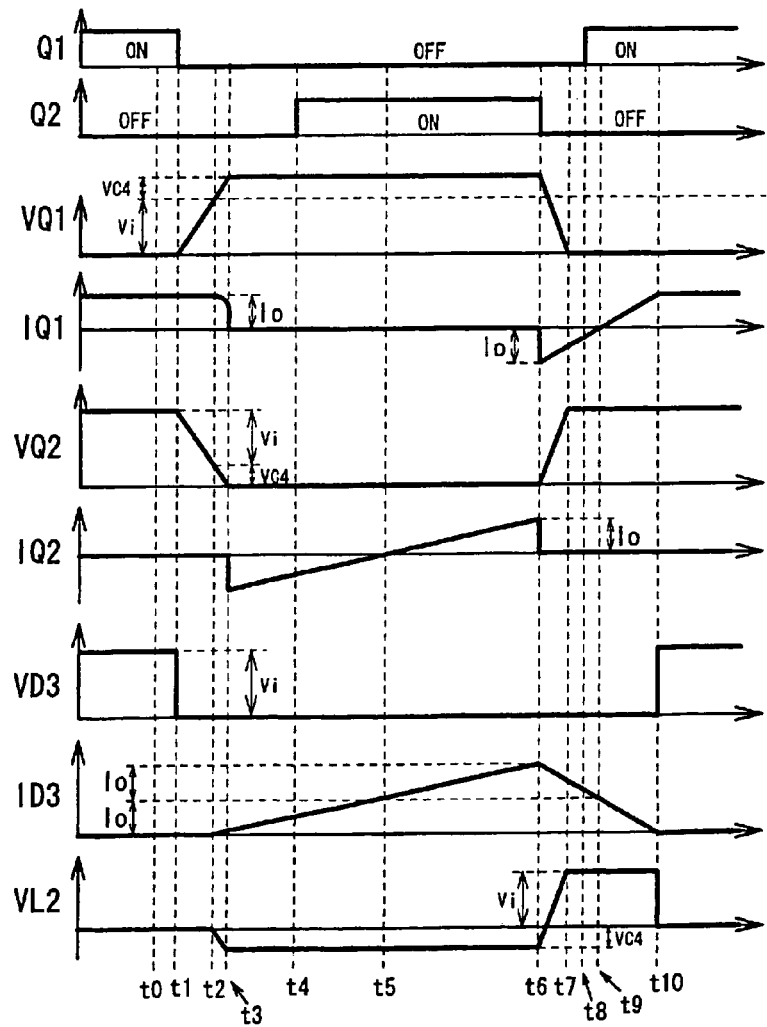
FIG. 4 is a timing chart for an operation of the DC-DC converter according to the first embodiment of the present invention.
Figure 5A:
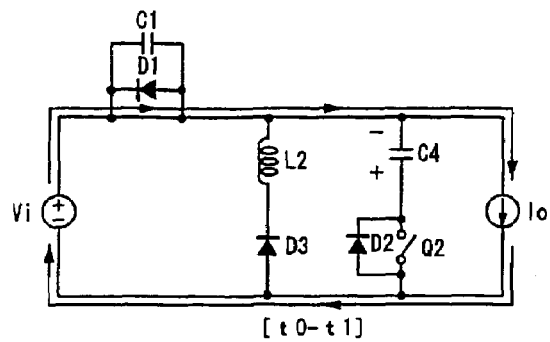

At a time t0 and also a period t0-t1, the main switching element Q1 is set turned-on while the auxiliary switching element Q2 is turned-off as shown in FIG. 4, and a constant current Io flows from the constant voltage power source Vi via the main switching element Q1 as shown in FIG. 5A. During the period t0-t1, the voltage VQ2 stays at a value of "Vi+VC4".

Figure 5B:
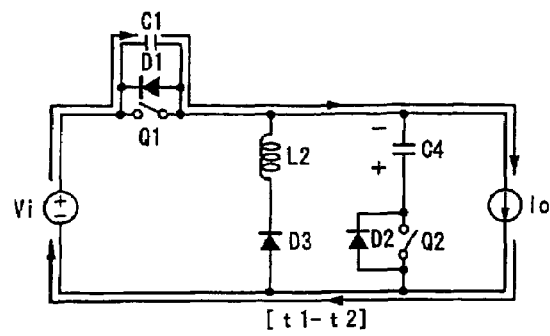

When the main switching element Q1 is turned off at a time t1, the capacitor C1 is charged by the constant current source Io at a period t1-t2 as shown in FIG. 5B, and the voltage VQ1 goes up and reaches Vi at a time t2 while the voltage VQ2 goes down to VC4 as shown in FIG. 4.

Figure 5C:
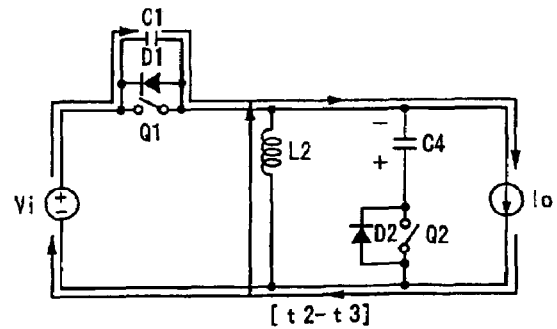

At a period t2-t3, the flywheel diode D3 conducts, and the current ID3 is caused to flow as shown in FIG. 5C. The capacitor C1 is charged by a current having a value of "Io-ID3" at the period t2-t3, and the voltage VQ1 keeps going up and reaches "Vi+VC4" at a time t3 while the voltages VQ2 and VL2 go down to zero and −VC4, respectively, as shown in FIG. 4.

Figure 5D:
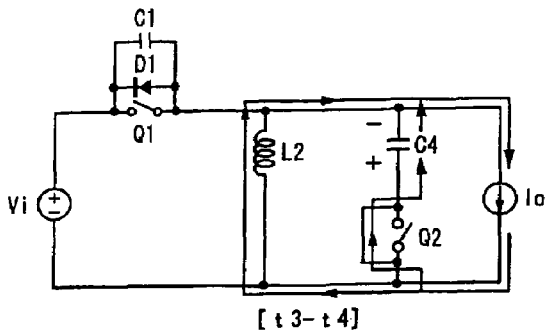

At a period t3-t4, the current ID3 increases linearly due to the operation of the resonant coil L2 as shown in FIG. 4, and the diode 2 conducts causing the current IQ2 having a value of "ID3−Io" to flow in the reverse direction as shown in FIG. 5D thereby charging the resonant capacitor C4.

Figure 6A:
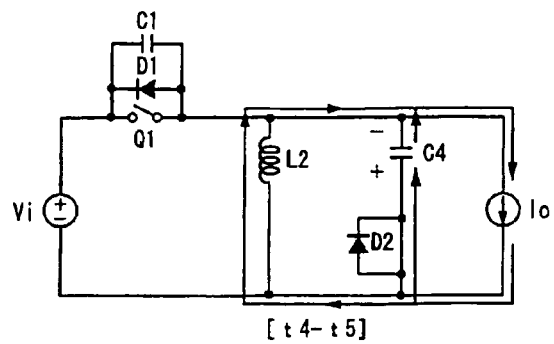

When the auxiliary switching element Q2 is turned on at a time t4, the current IQ2, which was flowing through the diode 2, is caused to flow through the auxiliary switching element Q2 at a period t4-t5 as shown in FIG. 6A. At the period t4-t5, the current ID3 increases linearly due to the operation of the resonant coil L2, and the current IQ2 measures "ID3−Io". At a time t5, the current IQ2 arrives at zero, and the current ID3 arrives at Io. In this connection, the time t4, at which the auxiliary switching element Q2 is turned on, may be positioned anywhere between the times t3 and t5 but is preferably set closer to the time t3 for reducing the conduction loss of the auxiliary switching element Q2.

At a period t5-t6, the current ID3 further increases linearly due to the operation of the resonant coil L2 (refer to FIG. 6B) thus exceeding Io as shown in FIG. 4. In order to supplement the current, the capacitor C4 is discharged via the auxiliary switching element Q2. At this stage, the current IQ2 measures "ID3−Io". At a time t6, the current ID3 arrives at "2×Io", and the current IQ2 arrives at Io.

Figure 6B:
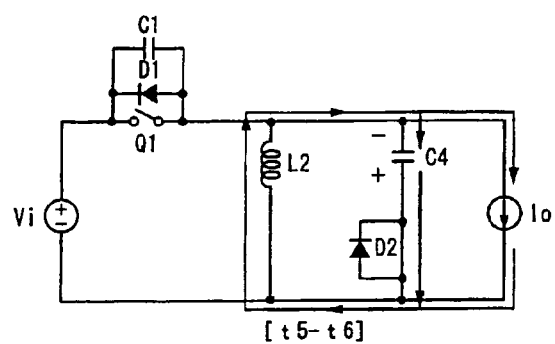
Figure 6C:
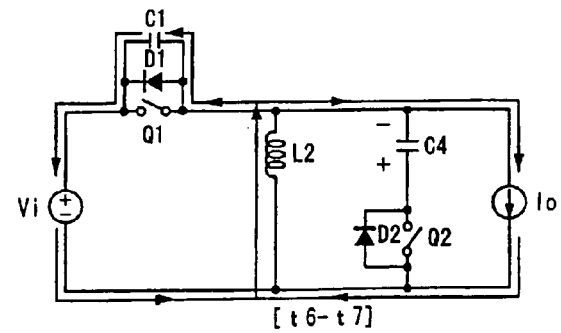

When the auxiliary switching element Q2 is turned off at the time t6, the current, which was flowing through the resonant coil L2, starts flowing in such a direction as to discharge the capacitor C1 at a period t6-t7 as shown in FIG. 6C, and the current ID3 is caused to start to linearly decrease. Also, due to the discharge of the capacitor C1, the voltage VQ1 is caused to decrease while the VQ2 is caused to increase. At the time t6, the current ID3 measures "2×Io", and so the current IQ1 measures −Io. At a time t7, the discharge of the capacitor C1 is finished, and the voltage VQ1 measures zero. The voltages VQ2 and VL2 increase at the period t6-t7, and arrive at "Vi+VC4" and Vi, respectively, at the time t7.

Figure 6D:
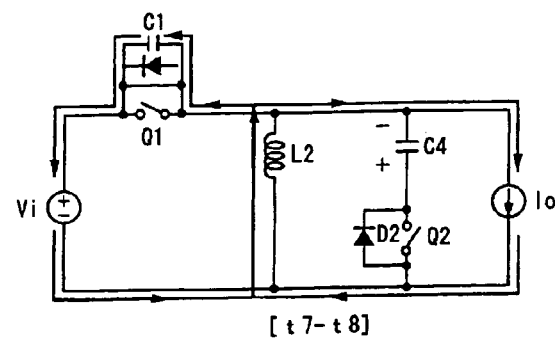

At a period t7-t8, the diode D1 conducts, and the current IQ1 is caused to flow in the reverse direction as shown in FIG. 6D. The current ID3 continues to linearly decrease due to the operation of the resonant coil L2, and the current IQ1 measures "Io-ID3" at a time t8.

Figure 7A:
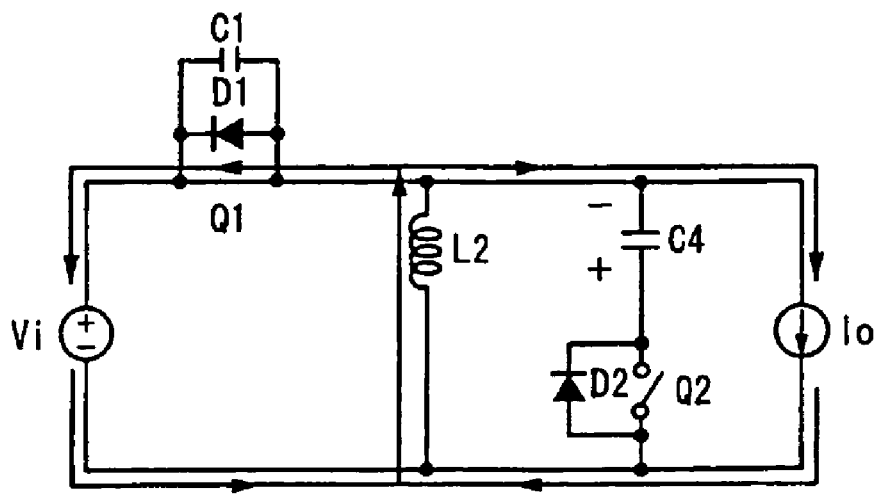

When the main switching element Q1 is turned on at the time t8, the current, which was flowing through the diode D1, starts flowing through the main switching element Q1 as shown in FIG. 7A, and the current ID3 continues to linearly decrease due to the operation of the resonant coil L2 at a period t8-t9. Here, the time t8, at which the main switching element Q1 is turned on, may be positioned anywhere between the times t7 and t9 but is preferably set closer to the time t7 for reducing the conduction loss of the main switching element Q1. When the current ID3 measures Io at the time t9, the current IQ1 arrives at zero.

Figure 7B:
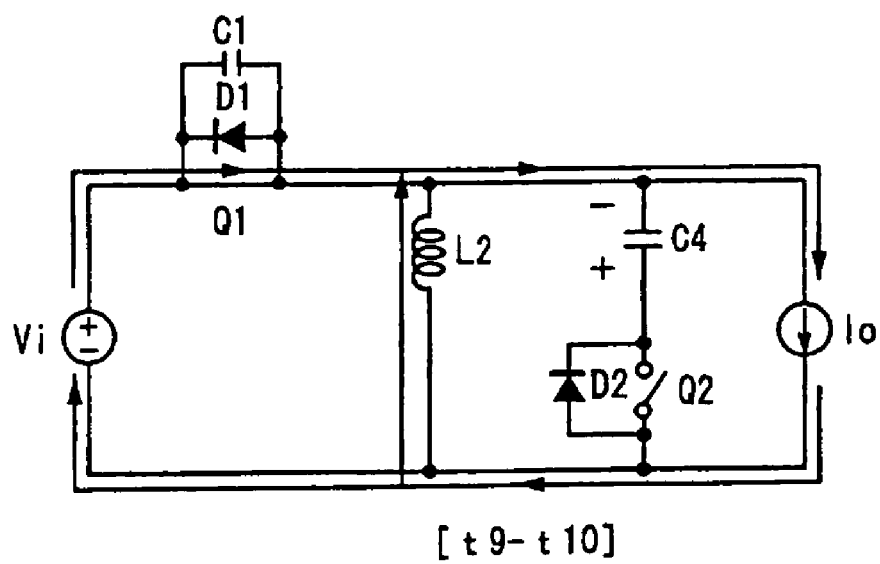

At a period t9-t1O, at which a current flows as shown in FIG. 7B, the current ID3 continues to linearly decrease due to the operation of the resonant coil L2, and the current IQ1 further increases linearly and starts to flow in the positive direction as shown in FIG. 4. The currents ID3 and IQ1 arrive at zero and Io, respectively, at a time t10, at which the voltage VL2 goes down to zero, and the voltage VD3 goes up to Vi. Then, the DC-DC converter 10 continues its operation starting over from the time t0, and the cycle described above is repeated.

In the operation of the DC-DC converter 10, the voltage VQ1 measures zero at the moment when the main switching element Q1 is turned off (time t1) or turned on (time t8), and the voltage VQ2 measures zero at the moment when the auxiliary switching element VQ2 is turned on (time t4) or turned off (time t6) as described above, and therefore zero volt switching is realized thus significantly reducing the switching loss. Also, since the current ID3 decreases moderately (from t6 to t10), the recovery current of the flywheel diode D3 at the time of reverse recovery can be reduced significantly.

Figure 8A:
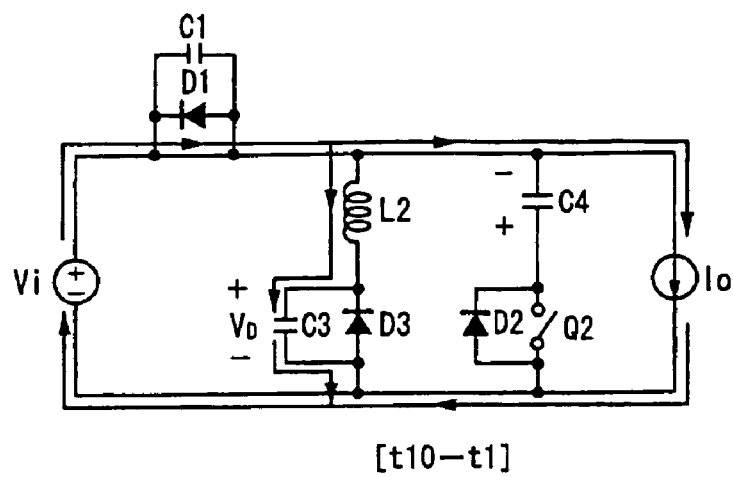
FIG. 8A shows a state of current in the first embodiment of the present invention when a junction capacitance of a flywheel diode is considered.
Figure 8B:
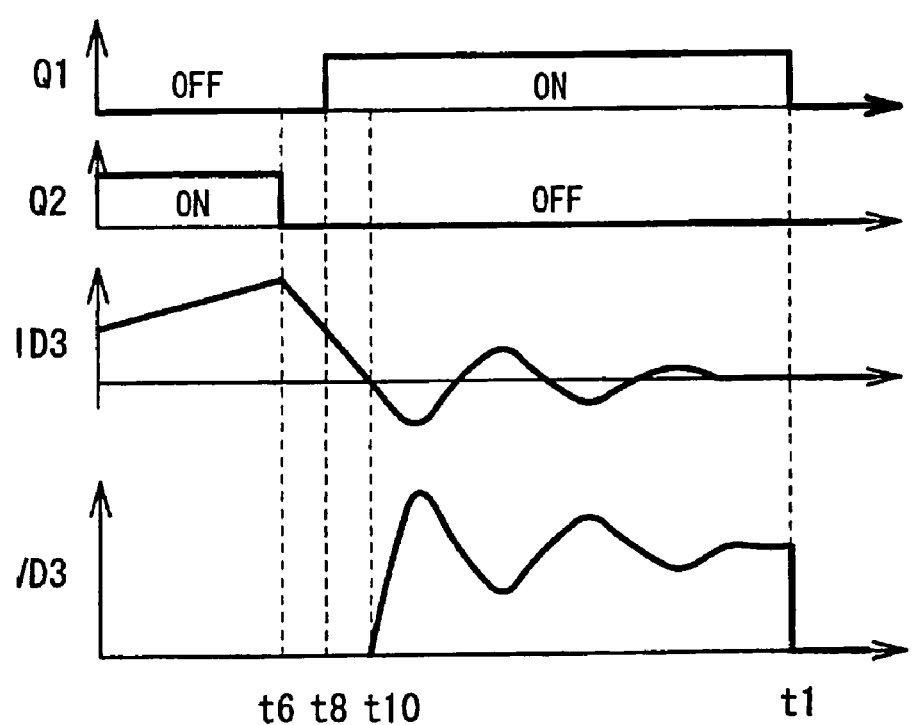
FIG. 8B is a timing chart corresponding to FIG. 8A.

Description will now be made on the influence from the junction capacitance C3 of the flywheel diode D3. The description made so far is based on the assumption that, as shown in FIG. 4, after the auxiliary switching element Q2 is turned off at the time t6, the current ID3 flowing through the flywheel diode D3 decreases linearly to arrive at zero at the time t10 and stays at zero after the time t10 representing a steady state operation (refer to FIG. 5A). However, when the junction capacitance C3 of the flywheel diode D3 is not negligible in the circuitry shown in FIG. 3, the current ID3, while repeatedly charging and discharging the junction capacitance C3, continues to flow even after the time t10 as shown in FIG. 8A, and linking as shown in FIG. 8B is generated due to the resonance of the junction capacitance C3 and the resonant coil L2.

Figure 9A:
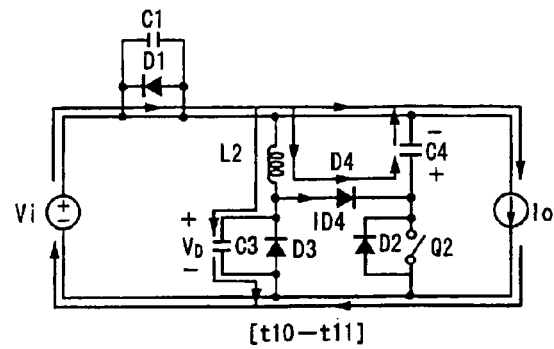
FIGS. 9A and 9B show states of current representing operations of diode modules shown in FIGS. 2A and 2B, respectively, in the first embodiment of the present invention.
Figure 9B:
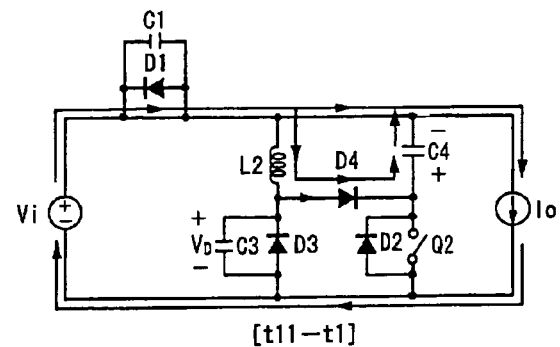
Figure 9C:
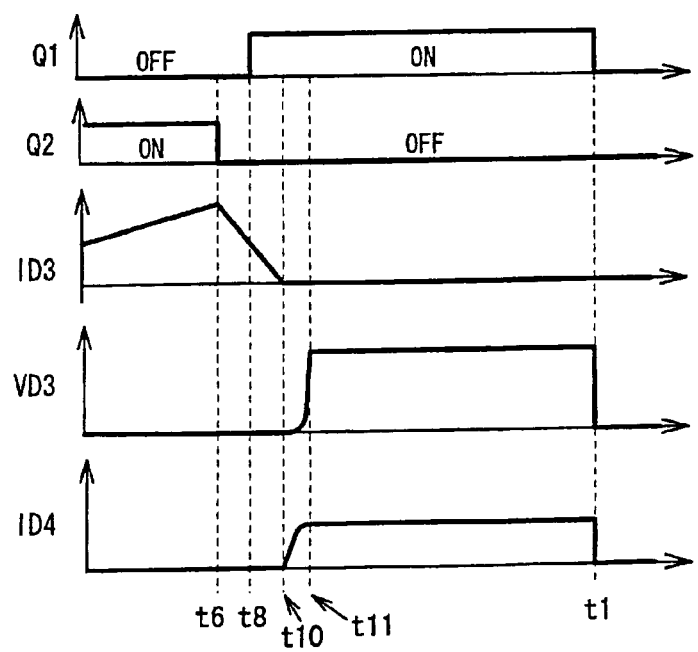
FIG. 9C is a timing chart corresponding to FIGS. 9A and 9B.

In the DC-DC converter 10 according to the present invention, the second diode D4 is provided in its diode module 20/20' as shown in FIG. 2A/2B, whereby the aforementioned liking generation is inhibited. Specifically, in the diode module 20/20', resonance energy is allowed to flow into the capacitor C4 via the diode D4 as shown in FIG. 9A, and accordingly the voltage VD3 at the flywheel diode D3 starts going up at the time t10, arrives at "Vi+CV4" at a time t11 (a supplementary time defined for explanation convenience) and is clamped at the value ("Vi+CV4") as shown in FIG. 9C, thus causing no charging and discharging of the junction capacitance C3 after the time t11 as shown in FIG. 9B.

Figure 10:
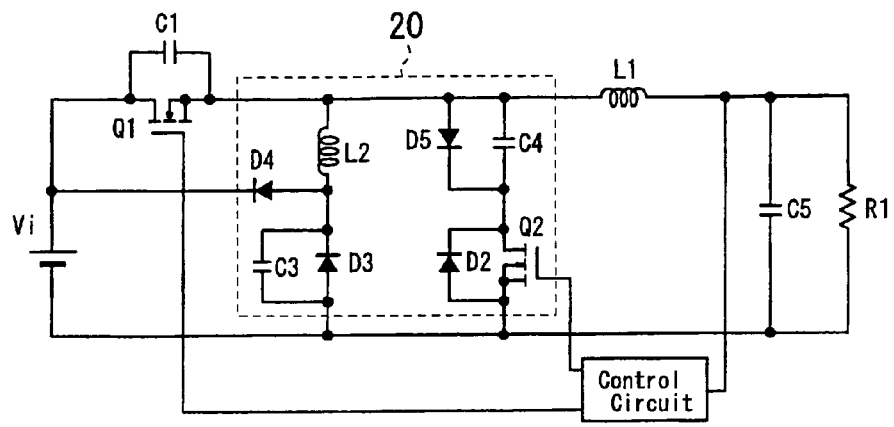
FIG. 10 is a circuit diagram of a diode arrangement different from that shown in FIG. 1 in the fist embodiment of the present invention.

Referring to FIG. 10, the linking generation can alternatively be inhibited by a third diode (this diode is denoted also by D4 in the figure for convenience sake) D4 provided between the DC power source Vi and the connection point of the resonant coil L2 and the flywheel diode D3, in place of the second diode D4 provided in the diode module 20/20'. In this case, the voltage VD3 of the flywheel diode D3 is clamped at Vi.

The operation of the first diode D5 shown in FIG. 2A/2B will be explained. For the purpose of explanation, it is assumed that a very low output voltage is achieved by using a vanishingly low duty ratio (near 0%) in a DC-DC converter which is structured identical with the DC-DC converter 10 except that the first diode D5 is omitted in the diode module 20. In such an assumption, the period t7-t10 (FIGS. 6D, 7A and 7B) in the timing chart shown in FIG. 4 is very short, and therefore a sufficient energy cannot be stored up in the resonant coil L2, which results in that the capacitor C1 cannot be charged up to the voltage of "Vi+VC4" during the period t1-t3 (FIGS. 5B and 5C). Consequently, the resonant capacitor C4 cannot be sufficiently charged during the period t3-t5 (FIGS. 5D and 6A), and the voltage VC4 across the resonant capacitor C4 is caused to gradually decrease while the resonant capacitor C4 is discharged during the period t5-t6 (FIG. 6B). With the repletion of the cycle described above, the voltage VC4 across the resonant capacitor C4 has its direction eventually reversed thus failing to be able to duly reset the resonant coil L2, which results in that the operation shown in FIG. 4 cannot be normally performed.

In the DC-DC converter 10 according to the present invention, the diode module 20 includes the first diode D5 connected to the resonant capacitor C4 in parallel, whereby it is prevented that the voltage VC4 across the resonant capacitor C4 has its direction reversed. Consequently, the DC-DC converter 10 can be normally operated at such an extremely low duty ratio as near 0%. If the DC-DC converter 10 is not applied at such a low duty ratio, then the diode D5 can be omitted.

The first embodiment described above refers to a DC-DC converter including a step-down circuit, but the present invention is not limited to such a structure and may be applied to DC-DC converters including other type circuits such that the diode module 20/20' shown in FIG. 2A/2B is provided to substitute for a flywheel diode in conventional DC-DC converters, whereby the same advantageous effects can be achieved. Further embodiments of the present invention will hereinafter be described, in which the diode module 20 is incorporated in DC-DC converters including step-up, step-up and step-down, Cuk, Sepic, and Zeta circuits. Since the operation of the diode module 20 is common to all the embodiments including the first embodiment, description will be focused on structures specific to respective embodiments.

Figure 11:
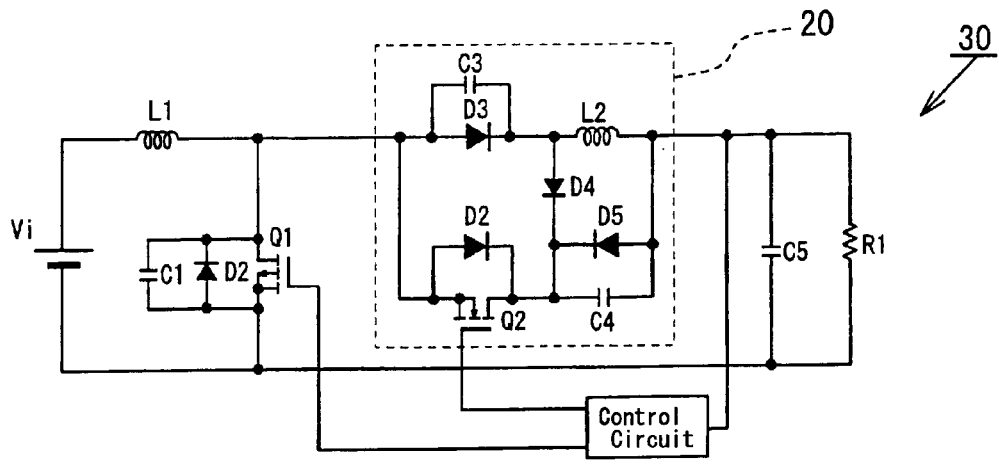
FIG. 11 is a circuit diagram of a DC-DC converter, specifically a step-up DC-DC converter, according to a second embodiment of the present invention.

Referring to FIG. 11, a DC-DC converter 30 according to a second embodiment of the present invention is a step-up DC-DC converter, in which a choke coil L1 is connected via its one terminal to the positive terminal of a DC power source Vi, and via its other terminal to the drain terminal of a main switching element Q1 which has its source terminal connected to the negative terminal of the DC power source Vi. A diode module 20 is connected via its anode terminal to the connection point of the choke coil L1 and the main switching element Q1, and via its cathode terminal to one terminal of an output capacitor C5.

Figure 12:
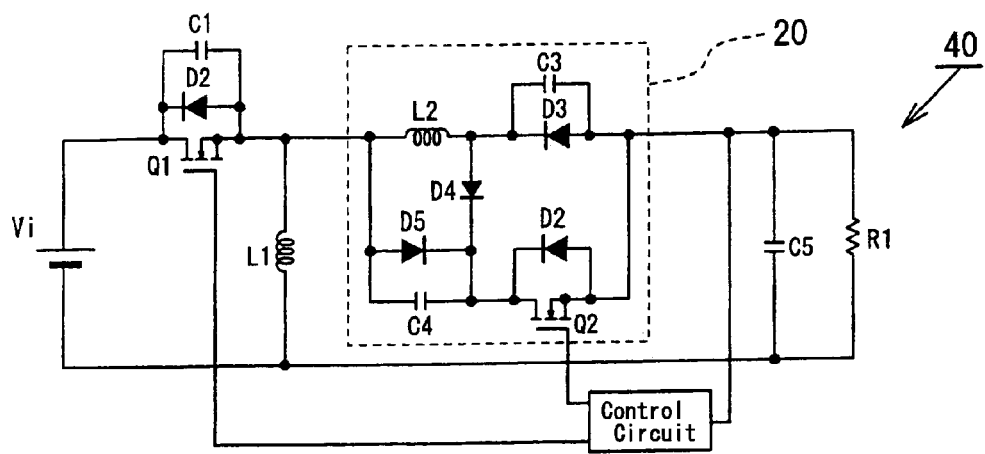
FIG. 12 is a circuit diagram of a DC-DC converter, specifically a step-up and step-down DC-DC converter, according to a third embodiment of the present invention.

Referring to FIG. 12, a DC-DC converter 40 according to a third embodiment of the present invention is a step-up and step-down DC-DC converter, in which a main switching element Q1 is connected via its drain terminal to the positive terminal of a DC power source Vi, and via its source terminal to one terminal of a choke coil L1 which has its other terminal connected to the negative terminal of the DC power source Vi. A diode module 20 is connected via its cathode terminal to the connection point of the main switching element Q1 and the choke coil L1, and via its anode terminal to one terminal of an output capacitor C5.

Figure 13:
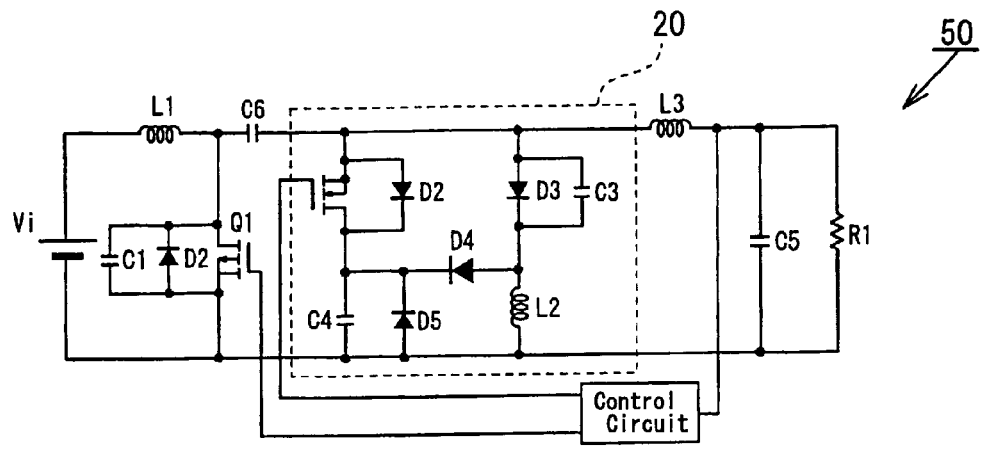
FIG. 13 is a circuit diagram of a DC-DC converter, specifically a Cuk DC-DC converter, according to a fourth embodiment of the present invention.

Referring to FIG. 13, a DC-DC converter 50 according to a fourth embodiment of the present invention is a Cuk DC-DC converter adapted to perform a step-up and step-down operation, in which a first choke coil L1 is connected via its one terminal to the positive terminal of a DC power source Vi, and via its other terminal to the drain terminal of a main switching element Q1 and also to one terminal of a coupling capacitor C6, the source terminal of the main switching element Q1 is connected to the negative terminal of the DC power source Vi, and the other terminal of the coupling capacitor C6 is connected to one terminal of a second choke coil L3 which has its other terminal connected to one terminal of an output capacitor C5. A diode module 20 is connected via its cathode terminal to the connection point of the coupling capacitor C6 and the second choke coil L3, and via its anode terminal to the negative terminal of the DC power source Vi.

Figure 14:
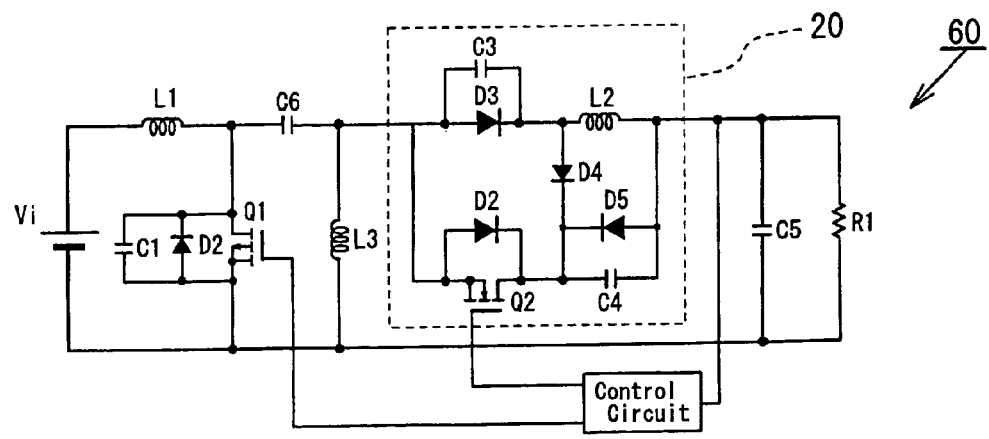
FIG. 14 is a circuit diagram of a DC-DC converter, specifically a Sepic DC-DC converter, according to a fifth embodiment of the present invention.

Referring to FIG. 14, a DC-DC converter 60 according to a fifth embodiment of the present invention is a Sepic DC-DC converter adapted to perform a step-up and step-down operation, in which a first choke coil L1 is connected via its one terminal to the positive terminal of a DC power source Vi, and via its other terminal to the source terminal of a main switching element Q1 and also to one terminal of a coupling capacitor C6, the drain terminal of the main switching element Q1 is connected to the negative terminal of the DC power source Vi, and the other terminal of the coupling capacitor C6 is connected to one terminal of a second choke coil L3 which has its other terminal connected to the negative terminal of the DC power source Vi. A diode module 20 is connected via its anode terminal to the connection point of the coupling capacitor C6 and the second choke coil L3, and via its cathode terminal to one terminal of an output capacitor C5.

Figure 15:
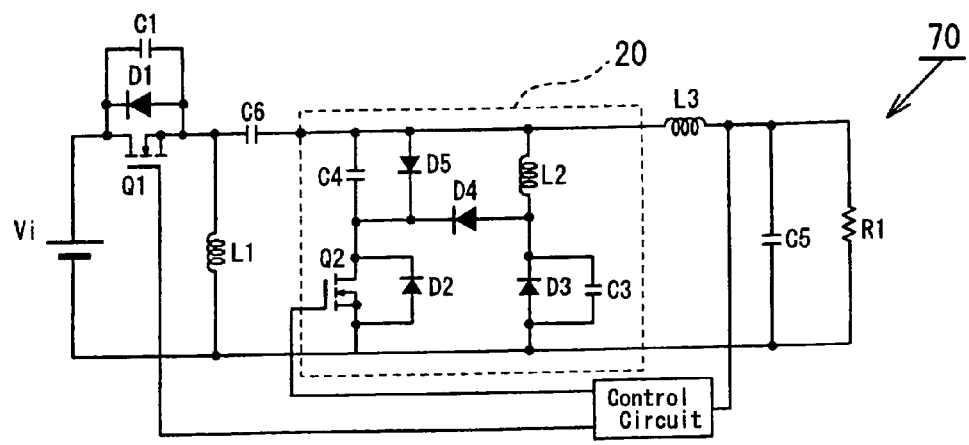
FIG. 15 is a circuit diagram of a DC-DC converter, specifically Zeta DC-DC converter, according to a sixth embodiment of the present invention.

Referring to FIG. 15, a DC-DC converter 70 according to a sixth embodiment of the present invention is a Zeta DC-DC converter adapted to perform a step-up and step-down operation, in which a main switching element Q1 is connected via its drain terminal to the positive terminal of a DC power source Vi, and via its source terminal to one terminal of a first choke coil L1 and also to one terminal of a coupling capacitor C6, the other terminal of the first choke coil L1 is connected to the negative terminal of the DC power source Vi, and the other terminal of the coupling capacitor C6 is connected to one terminal of a second choke coil L3 which has its other terminal connected to one terminal of an output capacitor C5. A diode module 20 is connected via its cathode terminal to the connection point of the coupling capacitor C6 and the second choke coil L3, and via its anode terminal to the negative terminal of the DC power source Vi.

While the present invention has been illustrated and explained with respect to specific embodiments thereof, it is to be understood that the present invention is by no means limited thereto but encompasses all changes and modifications that will become possible within the scope of the appended claims.

What is claimed is:

1. A DC-DC converter comprising:
   a main switching element to perform an on-off operation;
   a first choke coil;
   an output capacitor; and
   a diode module comprising: a first series circuit comprising an auxiliary switching element and a resonant capacitor; a second series circuit comprising a flywheel diode and a resonant coil and connected in parallel to the first series circuit; and a second diode connected between a connection point of the auxiliary switching element and the resonant capacitor and a connection point of the flywheel diode and the resonant coil, wherein a voltage of a DC power source is converted into a different DC voltage based on the on-off operation of the main switching element.

2. A DC-DC converter according to claim 1, wherein the diode module further comprises a first diode connected in parallel to the resonant capacitor.

3. A DC-DC converter according to claim 1, wherein one terminal of the main switching element is connected to one terminal of the DC power source, the other terminal of the main switching element is connected to one terminal of the first choke coil, the other terminal of the first choke coil is connected to one terminal of the output capacitor, and the diode module is connected between the other terminal of the DC power source and a connection point of the main switching element and the first choke coil, whereby a step-down operation is performed.

4. A DC-DC converter according to claim 1, wherein one terminal of the first choke coil is connected to one terminal of the DC power source, the other terminal of the first choke coil is connected to one terminal of the main switching element, the other terminal of the main switching element is connected to the other terminal of the DC power source, and the diode module is connected between one terminal of the output capacitor and a connection point of the first choke coil and the main switching element, whereby a step-up operation is performed.

5. A DC-DC converter according to claim 1, wherein one terminal of the main switching element is connected to one terminal of the DC power source, the other terminal of the main switching element is connected to one terminal of the first choke coil, the other terminal of the first choke coil is connected to the other terminal of the DC power source, and the diode module is connected between one terminal of the output capacitor and a connection point of the main switching element and the first choke coil, whereby a step-up and step-down operation is performed.

6. A DC-DC converter according to claim 1, further comprising a coupling capacitor and a second choke coil, wherein one terminal of the first choke coils is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to one terminal of the output capacitor, and the diode module is connected between the other terminal of the DC power source and a connection point between the coupling capacitor and the second choke coil, whereby a step-up and step-down operation is performed.

7. A DC-DC converter according to claim 1, further comprising a coupling capacitor and a second choke coil, wherein one terminal of the first choke coil is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to the other terminal of the DC power source, and the diode module is connected between one terminal of the output capacitor and a connection point of the coupling capacitor and the second choke coil, whereby a step-up and step-down operation is performed.

8. A DC-DC converter according to claim 1, further comprising a coupling capacitor and a second choke coil, wherein one terminal of the main switching element is connected to one terminal of the DC power source, the other terminal of the main switching element is connected to one terminal of the first choke coil and also to one terminal of the coupling capacitor, the other terminal of the first choke coil is connected to the other terminal of the DC power source, the other terminal of the coupling capacitor is connected to one terminal of the second choke coil, the other terminal of the second choke coil is connected to one terminal of the output capacitor, and the diode module is connected between the other terminal of the DC power source and a connection point of the coupling capacitor and the second choke coil, whereby a step-up and step-down operation is performed.

9. A DC-DC converter according to claim 1, wherein a capacitor is connected in parallel to the main switching element.

10. A DC-DC converter comprising:
   a main switching element to perform an on-off operation;
   a first choke coil;
   an output capacitor; and
   a diode module comprising: a first series circuit comprising an auxiliary switching element and a resonant capacitor; a second series circuit comprising a flywheel diode and a resonant coil and connected in parallel to the first series circuit; and a third diode connected between a DC power source and a connection point of the resonant coil and the flywheel diode, wherein a voltage of the DC power source is converted into a different DC voltage based on the on-off operation of the main switching element.

11. A DC-DC converter according to claim 2, wherein one terminal of the main switching element is connected to one terminal of the DC power source, the other terminal of the main switching element is connected to one terminal of the first choke coil, the other terminal of the first choke coil is connected to one terminal of the output capacitor, and the diode module is connected between the other terminal of the DC power source and a connection point of the main switching element and the first choke coil, whereby a step-down operation is performed.

12. A DC-DC converter according to claim 2, wherein one terminal of the first choke coil is connected to one terminal of the DC power source, the other terminal of the first choke coil is connected to one terminal of the main switching element, the other terminal of the main switching element is connected to the other terminal of the DC power source, and the diode module is connected between one terminal of the output capacitor and a connection point of the first choke coil and the main switching element, whereby a step-up operation is performed.

13. A DC-DC converter according to claim 2, wherein one terminal of the main switching element is connected to one terminal of the DC power source, the other terminal of the main switching element is connected to one terminal of the first choke coil, the other terminal of the first choke coil is connected to the other terminal of the DC power source, and the diode module is connected between one terminal of the output capacitor and a connection point of the main switching element and the first choke coil, whereby a step-up and step-down operation is performed.

14. A DC-DC converter according to claim 2, further comprising a coupling capacitor and a second choke coil, wherein one terminal of the first choke coils is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to one terminal of the output capacitor, and the diode module is connected between the other terminal of the DC power source and a connection point between the coupling capacitor and the second choke coil, whereby a step-up and step-down operation is performed.

15. A DC-DC converter according to claim 2, further comprising a coupling capacitor and a second choke coil, wherein one terminal of the first choke coil is connected to one terminal of the DC power source, the other terminal of the first choke coil is connected to one terminal of the main switching element and also to one terminal of the coupling capacitor, the other terminal of the main switching element is connected to the other terminal of the DC power source, the other terminal of the coupling capacitor is connected to one terminal of the second choke coil, the other terminal of the second choke coil is connected to the other terminal of the DC power source, and the diode module is connected between one terminal of the output capacitor and a connection point of the coupling capacitor and the second choke coil, whereby a step-up and step-down operation is performed.

16. A DC-DC converter according to claim 2, further comprising a coupling capacitor and a second choke coil, wherein one terminal of the main switching element is connected to one terminal of the DC power source, the other terminal of the main switching element is connected to one terminal of the first choke coil and also to one terminal of the coupling capacitor, the other terminal of the first choke coil is connected to the other terminal of the DC power source, the other terminal of the coupling capacitor is connected to one terminal of the second choke coil, the other terminal of the second choke coil is connected to one terminal of the output capacitor, and the diode module is connected between the other terminal of the DC power source and a connection point of the coupling capacitor and the second choke coil, whereby a step-up and step-down operation is performed.

17. A DC-DC converter according to claim 2, wherein a capacitor is connected in parallel to the main switching element.

* * * * *

UNITED STATES PATENT AND TRADEMARK OFFICE
CERTIFICATE OF CORRECTION

PATENT NO.       : 7,486,055 B2
APPLICATION NO.  : 10/592672
DATED            : February 3, 2009
INVENTOR(S)      : Masaya Yamashita It is certified that error appears in the above-identified patent and that said Letters Patent is hereby corrected as shown below:

On the Title page, Item (73) Assignee

(73) Mineba Co., Ltd., Kitasaku (JP)

and Replace with:

(73) Minebea Co., Ltd., Kitasaku (JP)

Signed and Sealed this

Twenty-eighth Day of April, 2009

JOHN DOLL
*Acting Director of the United States Patent and Trademark Office*